United States Patent
Bond

(10) Patent No.: US 11,001,488 B2
(45) Date of Patent: May 11, 2021

(54) FLUID DISPENSING APPARATUS AND METHOD OF USE THEREOF

(71) Applicant: Jonathan Bond, Yorkshire (GB)

(72) Inventor: Jonathan Bond, Yorkshire (GB)

( * ) Notice: Subject to any disclaimer, the term of this patent is extended or adjusted under 35 U.S.C. 154(b) by 0 days.

(21) Appl. No.: 16/554,083

(22) Filed: Aug. 28, 2019

(65) Prior Publication Data

US 2020/0071151 A1    Mar. 5, 2020

(30) Foreign Application Priority Data

Sep. 3, 2018 (GB) ...................................... 1814270

(51) Int. Cl.
| | |
|---|---|
| *B65D 1/06* | (2006.01) |
| *B67C 3/26* | (2006.01) |
| *B67D 1/00* | (2006.01) |
| *B67D 1/12* | (2006.01) |
| *F16K 31/44* | (2006.01) |
| *B67C 3/00* | (2006.01) |
| *B67D 1/14* | (2006.01) |
| *B67D 1/08* | (2006.01) |
| *F16K 23/00* | (2006.01) |

(52) U.S. Cl.
CPC ............ *B67D 1/0082* (2013.01); *B67C 3/007* (2013.01); *B67C 3/264* (2013.01); *B67D 1/0004* (2013.01); *B67D 1/0085* (2013.01); *B67D 1/0888* (2013.01); *B67D 1/1272* (2013.01); *B67D 1/1277* (2013.01); *B67D 1/1422* (2013.01); *F16K 31/44* (2013.01); *B65D 1/06* (2013.01); *B67D 2001/0088* (2013.01); *B67D 2001/0093* (2013.01); *B67D 2001/0095* (2013.01); *B67D 2001/1483* (2013.01); *F16K 23/00* (2013.01)

(58) Field of Classification Search
CPC .... B67D 1/0085; B67D 1/0082; B67D 3/007; B67D 1/1272; B67D 1/1422; B67D 1/0888; B67D 1/0004; B67D 1/1277; B67D 2001/0095; B67D 2001/0088; B67D 1/124; B65D 1/06; F16K 31/44
USPC .................................................. 141/351, 353
See application file for complete search history.

(56) References Cited

U.S. PATENT DOCUMENTS

| | | | |
|---|---|---|---|
| 2004/0025968 A1* | 2/2004 | Allen | ..................... B67D 7/005 141/351 |
| 2013/0118639 A1* | 5/2013 | Springer | ............ A47G 19/2205 141/2 |

\* cited by examiner

*Primary Examiner* — Jason K Niesz
(74) *Attorney, Agent, or Firm* — McKee, Voorhees & Sease, PLC

(57) ABSTRACT

A dispensing nozzle assembly is provided including a nozzle member provided with one or more dispensing apertures to allow fluid to be dispensed therefrom in use. Closure means are provided on or associated with the nozzle member and movable relative thereto between a closed position, wherein the closure means closes the dispensing apertures and fluid cannot be dispensed from the dispensing apertures, and an open position, wherein the closure means are moved at least partially clear of the dispensing apertures and fluid can be dispensed through the dispensing apertures in use. Switch means are moveable between an "on" position for allowing fluid to flow into the nozzle member for dispensing through the dispensing apertures in use, and an "off" position for preventing fluid flowing into the nozzle member in use. The switch means are arranged such that movement of the closure means relative to the nozzle member moves or actuates the switch means between the on and off positions in use.

15 Claims, 5 Drawing Sheets

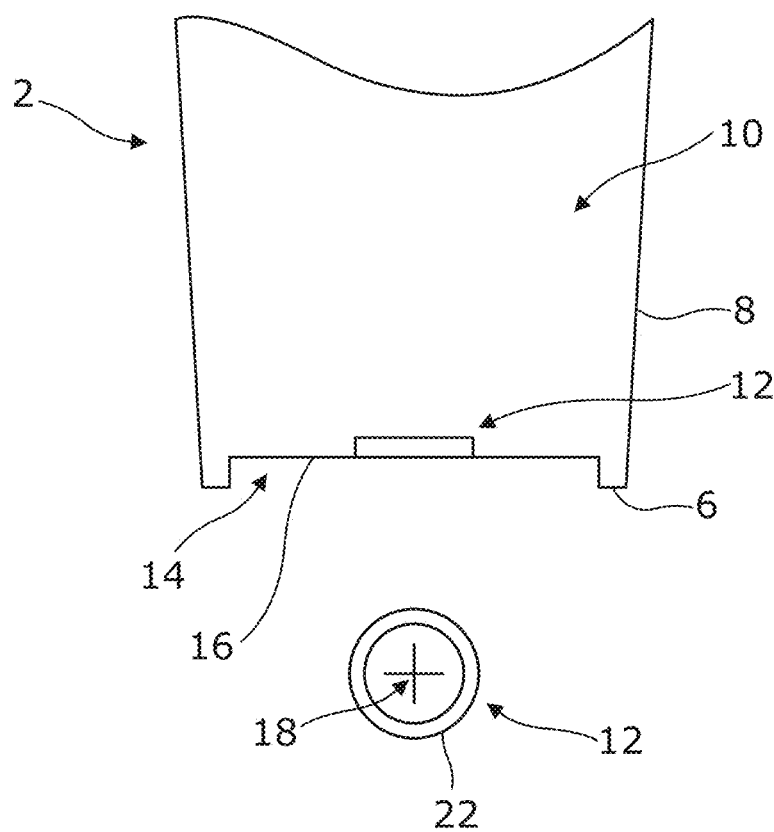
Figure 1a
Figure 1b
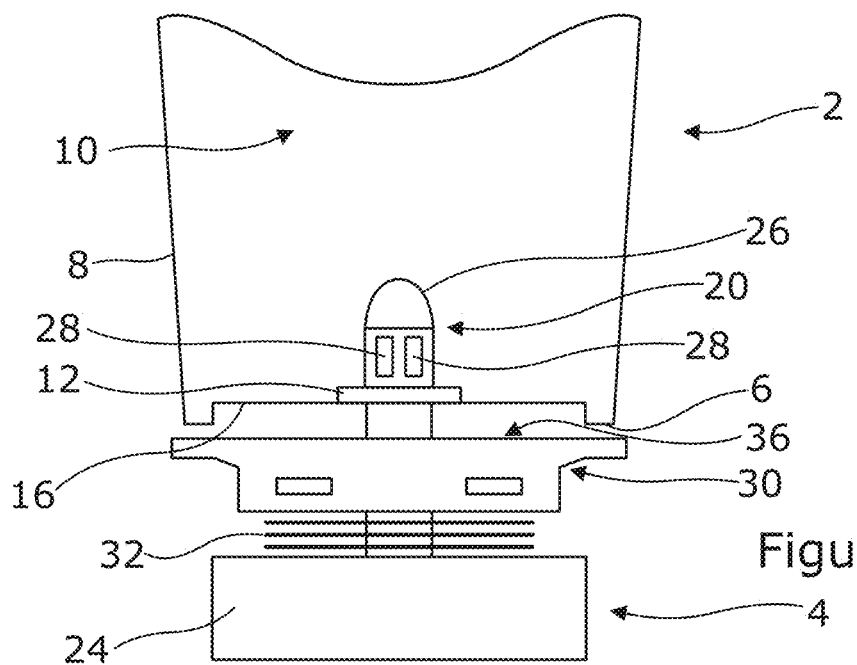
Figure 1c

FLUID DISPENSING APPARATUS AND METHOD OF USE THEREOF

CROSS-REFERENCE TO RELATED APPLICATIONS

This application claims priority to British application No. 1814270.3, filed on Sep. 3, 2018, which is herein incorporated by reference in its entirety.

This invention relates to fluid dispensing apparatus, a receptacle for receiving dispensed fluid, a dispensing nozzle assembly, an actuator assembly and/or a methods of use thereof.

Although the following description refers almost exclusively to fluid dispensing apparatus (or elements thereof) in the form of beer dispensing apparatus for dispensing beer therefrom, it will be appreciated by persons skilled in the art that the dispensing apparatus of the present invention can be arranged to dispense any beverage, fluid or liquid therefrom as required.

The dispensing of beer into a beer glass via a top of the glass using a tap dispensing apparatus is a method that has been used for many years. However, filling a beer glass from the top may increase the formation of foam in the drink, thereby requiring bar staff to remove the foam from the drink, which is wasteful, or waiting for the foam to dissipate, which is time consuming. In addition, top filling of a glass requires bar staff to perform a number of dispensing method steps, including correctly aligning the beer glass below the beer dispensing tap, moving the dispensing tap from an off condition to an on condition to allow beer to flow from the tap into the glass and, once the beer glass is full, moving the dispensing tap from an on condition to an off condition to stop the flow of beer from the tap. In an attempt to overcome the abovementioned problems, it is known to provide dispensing apparatus that allows a drinks receptacle to be filled from a bottom of the receptacle rather than from a top of the receptacle.

One example of bottom filling dispensing apparatus is disclosed in EP2526020. In this apparatus the dispenser includes a dispenser connection device that is arranged to be coupled to a container connection device provided on a container in use. A valve provided on the dispenser connection device is arranged to open automatically, when coupled with the container connection device on the container, to allow fluid to flow from the dispenser into the container in use. The valve is arranged to close automatically when the container is removed from the dispenser. The container connection device on the container includes a rubber valve that is covered by a magnetic cap normally provided in magnetic sealing engagement with a magnetic ring provided on a base of the container.

The dispenser connection device includes a valve assembly with a nozzle located on a platform which, when the container is correctly aligned with the dispenser connection device, pushes against the magnetic cap to lift the cap from the base of the container and allow insertion of the nozzle through the valve of the container. Apertures in the nozzle are exposed to allow fluid to flow into the container. The platform can include magnetic material to engage with the magnetic ring in the base of the container when the container is located on the platform in use. The platform is able to move in a longitudinal direction relative to the nozzle to open and close the nozzle apertures in use. The platform is typically sprung biased to the nozzle close position.

A pressure switch can be associated with the platform which detects when a container is correctly located on the platform in use and allows fluid to flow through the nozzle. The pressure switch is able to detect removal of the container from the platform to prevent fluid flowing to the nozzle in use.

The valve assembly includes a housing body, a valve actuator assembly to move the valve between open and closed positions and a fitting to couple the valve to a fluid source. The valve actuator assembly includes a solenoid, solenoid spring and solenoid plunger. The solenoid plunger is arranged for movement perpendicular to the longitudinal axis of the nozzle. When actuated, the solenoid plunger moves a ramp located in the housing body towards the solenoid. This in turn moves a sliding rod relative to the housing body and away from the valve. The sliding rod is coupled to a plunger shaft and plunger that are arranged parallel to the nozzle. As the sliding rod moves down relative to the housing body, the plunger shaft and the plunger are pulled down into the housing body causing the valve to open. The solenoid spring of the solenoid valve returns the plunger shaft back to its original position after the solenoid has actuated, allowing the valve to close. Movement of the plunger shaft in a direction perpendicular to the direction of movement of the solenoid plunger opens and closes the entrance to the nozzle apertures.

A problem associated with the above arrangement is that the use of magnetic material in the container is expensive and prevents the container from being easily recycled. In addition, the valve actuator assembly is relatively large and is not easily located in areas with restricted space, such as behind a bar. It is also a complex design and is relatively expensive to produce.

A further example of dispensing apparatus for bottom filling a container is disclosed in WO2016/166475. In this example, the container is provided with a self-sealing valve at the base of the container that is offset from the centre of the base. A dispensing nozzle on the dispensing apparatus is located through the self-sealing valve in use to allow fluid to flow into the container. A single aperture in the dispensing nozzle is inclined at an angle +30 and −30 degrees to direct the fluid being dispensed downwardly from the apertures to create a whirlpool type dispensing effect. A sensor is provided on the dispensing platform to detect the presence of a container on the dispensing platform in use. It then allows a solenoid valve provided in the platform to open to allow fluid to enter the nozzle to fill the container.

It is an aim of the present invention to provide alternative dispensing apparatus and/or a method of use or assembly thereof.

It is an aim of the present invention to provide an actuator assembly and/or method of use thereof for allowing fluid to flow from a fluid source to a dispensing nozzle assembly in use.

It is a further aim of the present invention to provide a receptacle for use with dispensing apparatus or a dispensing nozzle assembly and/or a method of use or assembly thereof.

It is a yet further aim of the present invention to provide a dispensing nozzle assembly for use with dispensing apparatus, an actuator assembly and/or for filling a receptacle in use; and/or a method of use or assembly of said dispensing nozzle assembly.

According to one aspect of the present invention there is provided a dispensing nozzle assembly, the dispensing nozzle assembly including:

a nozzle member provided with one or more dispensing apertures to allow fluid to be dispensed therefrom in use;

closure means provided on or associated with the nozzle
member and movable relative thereto between a closed
position, wherein the closure means closes the dispensing apertures and fluid cannot be dispensed from the
dispensing apertures, and an open position, wherein the
closure means are moved at least partially clear of the
dispensing apertures and fluid can be dispensed through
the dispensing apertures in use;

switch means moveable between an "on" position for
allowing fluid to flow into the nozzle member for
dispensing through the dispensing apertures in use, and
an "off" position for preventing fluid flowing into the
nozzle member in use;

characterised in that:

the switch means are arranged such that movement of the
closure means relative to the nozzle member moves or
actuates the switch means between the on and off
positions in use.

Preferably the dispensing nozzle assembly is for use with bottom filling dispensing apparatus and/or a bottom filling receptacle for dispensing fluid into a receptacle via a base of the receptacle.

Preferably the dispensing nozzle assembly includes a housing portion, and further preferably the nozzle member is provided on or associated with the housing portion.

Preferably the closure means is movable relative to the housing portion in moving between the open and closed positions in use.

Preferably movement of the closure means from the closed position to the open position moves or actuates the switch means from the off position to the on position in use.

Preferably the switch means is moved or actuates from the on position to the off position when the closure means moves from the open position to the closed position in use.

Preferably the closure means are resiliently biased to the closed position via resilient biasing means or a resilient biasing member.

Preferably the resilient biasing means or member includes one or more springs, coiled springs, sprung material and/or the like.

Preferably the resilient biasing means or member are provided around, on or associated with at least a part of the nozzle member.

Further preferably the resilient biasing means or member are provided on or associated with a lower surface of the closure means closest to a housing portion and/or furthest from the dispensing apertures when the closure means is in the open position.

Preferably the closure means comprises a top, upper or receptacle location surface for receiving a receptacle thereon which is to be bottom filled with fluid in use.

Preferably the closure means is any member which can be moved to allow the dispensing apertures to be opened or closed in use.

Preferably the closure means is in the form of a movable platform, collar, skirt or body portion.

Preferably the top, upper or receptacle location surface is a surface of the closure means facing away from the housing portion, and preferably opposite to the lower surface of the closure means, or closest to the free end of the nozzle member.

Preferably the top, upper or receptacle location surface of the closure means is flat, substantially flat, planar or substantially planar in form to allow a receptacle to be located on the same in a stable position in use. Thus, in one embodiment an upper surface of the closure means is acting as a platform for the location of a receptacle to be bottom filled with fluid in use.

In one embodiment magnetic means are provided on or associated with the closure means and/or nozzle member to allow some degree of magnetic attraction between the closure means and/or the nozzle member in certain positions. For example, the magnetic attraction between the magnetic means in the closure means and nozzle means can retain the closure means in a closed position, thereby reducing the strain placed on resilient biasing means also associated with the closure means.

In one example, the magnetic means of the closure means can be the same or different to magnetic means associated with the switch means.

In one embodiment an aperture or channel is defined in or through the closure means for location of the nozzle member through the same and for allowing the closure means to move relative to the nozzle member in use.

Preferably the aperture or channel is located centrally through the closure means.

In an alternative embodiment the closure means is positioned laterally or to the side of the nozzle member and is arranged for movement relative to the nozzle member in use.

Preferably the closure means is arranged to move in a direction parallel or substantially parallel to a longitudinal axis of the nozzle member in use.

Preferably the closure means is arranged to undergo linear or substantially linear movement, and further preferably reciprocal linear movement, in moving between the open and closed positions in use.

Preferably the closure means is arranged to be pushed down towards the housing portion or away from the free end of the nozzle member when moving from the closed position to the open position.

Preferably the direction of the push force is vertically down or perpendicular or transverse to a horizontal axis.

For example, the closure means can be pushed down manually either directly by a user's hand or placing a receptacle on the closure means, or indirectly via a user or other object applying a downwards force on the closure means or on a receptacle located on the closure means.

Preferably a pushing force is applied manually by a user via a receptacle being located on an upper surface, receptacle location means or top and is sufficient to move the closure means from the closed position to the open position.

Preferably the closure means is arranged to move in a vertical or substantially vertical direction in use.

Preferably the nozzle member is arranged to protrude outwardly from the housing portion.

Preferably the nozzle member is integral with the housing portion, or is attached or detachably attached to the housing portion via securing means or a securing mechanism.

Preferably the securing means or mechanism includes any or any combination of complementary screw threaded means or members, bayonet fitting, push fit connection, inter-engaging members, one or more protrusion, recesses, clips and/or the like.

Preferably the nozzle member is provided perpendicular or substantially perpendicular to the housing portion when in an attached or assembled position.

Preferably the nozzle member is a linear or substantially linear member.

Preferably the nozzle member is elongate or substantially elongate in form.

Preferably at least a main body portion of the nozzle member is cylindrical or substantially cylindrical in form.

Preferably two or more dispensing apertures are defined in the nozzle member for the dispensing of fluid therefrom in use.

Preferably four dispensing apertures are defined in the nozzle member for the dispensing of fluid therefrom.

Preferably the plurality of dispensing apertures are located at evenly or substantially evenly spaced distances around the nozzle member in use. This creates even or substantially even dispensing of fluid from the apertures, thereby controlling the amount of foam that may be generated during dispensing of a fluid therefrom in use. It also increases the speed at which fluid can be dispensed from the dispensing apertures in use.

Preferably the size and/or shape of the one or more dispensing apertures is arranged so as to limit the amount of foam that is produced when a liquid is dispensed from the same in use.

In one embodiment the two or more dispensing apertures are provided aligned, substantially aligned and/or parallel or substantially parallel to each other on the nozzle member. However, two or more of the dispensing members could be non-aligned or offset from each other on the nozzle member if required.

Preferably a longitudinal or central axis of one or more of the dispensing apertures is located parallel or substantially parallel to a longitudinal axis of the nozzle member.

Preferably a free end or tip of the nozzle member that is arranged to enter the valve means provided on a base wall of the receptacle in use, or an end of the nozzle member opposite to an end of the nozzle member provided on or associated with the housing portion, is dome shaped, curved, convexed, hemi-spherical in shape and/or the like. This prevents the valve means on the receptacle from being damaged on insertion of the nozzle member through the same in use.

Preferably the one or more dispensing apertures are provided at or adjacent the free end or tip of the nozzle member.

Preferably drainage means or elements are provided on or associated with the closure means for allowing fluid being dispensed from the dispensing nozzle that does not enter a receptacle in use of the assembly to drain away from the closure means and/or assembly.

Preferably the drainage means or elements includes one or more apertures, channels, recesses, slots and/or the like.

Preferably the drainage means or elements are provided on or associated with the top, upper or receptacle location surface of the closure means.

Preferably sealing means or a sealing member are provided on or associated with the closure means to allow the closure means to seal the dispensing apertures of the nozzle member when in a closed position.

Preferably the sealing means or member can include any or any combination of one or more sealing gaskets, sealing members, o-rings, sealing collars and/or the like.

In one embodiment the closure means is in the form of a collar that is movably mounted on the nozzle member in use.

Preferably fluid conduit means or member are provided in, on or associated with the nozzle member to allow fluid to flow from a fluid source or attachment assembly to the nozzle member in use.

In one embodiment the fluid conduit means or member are provided in, on or associated with the housing portion.

Preferably the fluid conduit means or member includes any or any combination of one or more channel members, sleeve members, tubing, hosing, pipes and/or the like.

Preferably the nozzle member has a channel defined therethrough in fluid communication with a fluid source, fluid conduit means, and the one or more dispensing apertures.

Preferably the fluid channel is arranged parallel or substantially parallel to a longitudinal axis of the nozzle member.

Preferably the fluid channel is arranged centrally or substantially centrally of the nozzle member.

Preferably the switch means are arranged such that movement of the closure means towards the housing portion, and preferably movement through a pre-determined or minimum distance towards the housing portion, moves the switch means from the off position to the on position in use.

Preferably movement of the closure means away from the housing portion, and preferably movement through a pre-determined or minimum distance away from the housing portion, moves the switch means from the on position to the off position in use.

Preferably the switch means can include any switch mechanism which is movable or which can be actuated between on and off positions for controlling fluid flow through the dispensing nozzle assembly in use.

Preferably the switch means is a magnetic switch or an electromagnetic switch.

Preferably the magnetic switch includes magnetic means or member provided on or associated with one of the closure means or housing portion, and a magnetic sensor provided on or associated with the other of the closure means or housing portion. Once the magnetic sensor detects the magnetic means is in physical contact with the same, is a pre-determined distance from the same, or in close proximity to the same, it moves the switch from an off position to an on position. Preferably once the magnetic sensor means detects no contact with the magnetic means, is greater than a pre-determined distance from the same, or is relatively far from the same, it moves the switch from the on position to the off position.

In one embodiment magnetic means or a magnetic member are provided in on or associated with the closure means, and preferably at or adjacent a lower or base surface of the closure means (or surface facing towards the housing portion).

In one embodiment magnetic sensing means are provided on or associated with the housing portion, and preferably at or adjacent a top or upper surface of the housing portion, for sensing physical contact with, a pre-determined distance or proximity of the magnetic means or magnetic member of the closure means therewith.

In one embodiment magnetic sensing means are provided on or associated with an actuator assembly of dispensing apparatus.

Preferably once the magnetic sensing means detects the magnetic means or magnetic member of the closure means is in contact with, pre-determined proximity to or close proximity to the same, it moves the switch from the off position to the on position.

Use of a magnetic switch means has the advantage that physical contact between the actuating members of the switch is not required, thereby allowing the switch means to be provided in a more compact location, it reduces the likelihood of fluid entering the switch and short circuiting the same, it is safer and/or the like.

Preferably the switch means is in wired, wireless, direct and/or indirect communication with control means or a control unit for allowing control of the dispensing apparatus, the actuator assembly and/or dispensing nozzle assembly in use.

Preferably the control means or control unit includes one or more micro-processing means, circuit boards, hardware, software and/or the like.

Preferably the dispensing nozzle assembly forms part of dispensing apparatus, and preferably bottom filling receptacle dispensing apparatus.

Preferably the dispensing nozzle assembly is used with or forms part of an actuator assembly that allows fluid to flow from a fluid source to the dispensing nozzle assembly.

Preferably the dispensing apparatus is an in-line dispensing apparatus.

According to an aspect of the present invention there is provided a method of using a dispensing nozzle assembly, the dispensing nozzle assembly including:

a nozzle member provided with one or more dispensing apertures to allow fluid to be dispensed therefrom in use; said method including the steps of:

moving closure means provided on or associated with the nozzle member relative thereto between a closed position, wherein the closure means closes the dispensing apertures and fluid cannot be dispensed from the dispensing apertures, and an open position, wherein the closure means are moved at least partially clear of the dispensing apertures and fluid can be dispensed through the dispensing apertures in use;

moving switch means between an "on" position for allowing fluid to flow into the nozzle member for dispensing through the dispensing apertures in use, and an "off" position for preventing fluid flowing into the nozzle member in use;

characterised in that:

the switch means are arranged such that movement of the closure means relative to the nozzle member moves or actuates the switch means between the on and off positions.

According to further independent aspects of the present invention there is provided a method of using the receptacle with bottom filling dispensing apparatus and/or a dispensing nozzle assembly; a method of using or assembling a dispensing nozzle assembly.

Although the receptacle referred to above can be used for bottom filling with fluid from bottom filling dispensing apparatus. It will be appreciated that the receptacle could be filled from the top of the receptacle in a conventional manner if required.

According to a further aspect of the present invention there is provided an actuator assembly for allowing fluid to flow from a fluid source to a dispensing nozzle assembly in use, said actuator assembly including actuator valve means movable between a closed position, wherein the actuator valve means engages with an actuator valve seat and fluid is prevented from flowing through the actuator valve means towards a dispensing nozzle assembly, and an open position, wherein the actuator valve means is moved a spaced distance apart from the actuator valve seat and fluid can flow through or around the actuator valve means in use towards a dispensing nozzle assembly, said actuator assembly further including plunger means for moving the actuator valve means between the open and closed positions in use, and solenoid means for driving movement of the plunger means in use, the solenoid means including a movable solenoid member, characterised in that the movable solenoid member and the plunger means are arranged such that they undergo parallel or substantially parallel movement in moving the actuator valve means between the open and closed positions.

The provision of the movable solenoid member and the plunger means or member to undergo parallel movement allows the actuator assembly to be simpler in design, and therefore be more cost effective to produce. In addition, the actuator assembly of the present invention is more compact compared to prior art arrangements wherein the movable solenoid member and the plunger means are arranged perpendicular to each other. This allows the actuator assembly, and/or the dispensing apparatus in which the actuator assembly may be provided in use, of the present invention to be used in areas where space is limited, such as in a bar area.

In one embodiment the actuator assembly forms part of the dispensing nozzle assembly and/or part of dispensing apparatus for dispensing fluid in use.

Preferably the movable solenoid member and the plunger means and/or the movement of the same are arranged in-line or substantially in-line with each other in the dispensing apparatus.

Further preferably the movable solenoid member, the plunger means and the actuator valve means and/or the movement of the same are arranged in-line or substantially in-line with each other in the dispensing apparatus.

Preferably each of the movable solenoid member, the plunger means and the actuator valve means has a longitudinal axis, and movement of at least one of the solenoid member, the plunger means and the actuator valve means is parallel or substantially parallel to the longitudinal axis of at least one other of the solenoid member, the plunger means and the actuator valve means.

Further preferably the movement of the solenoid member, the plunger means and the actuator valve means is parallel or substantially parallel to the longitudinal axes of the solenoid member, the plunger means and the actuator valve means.

Preferably the movable solenoid member, the plunger means and the actuator valve means are arranged to undergo linear or substantially linear movement in use in moving between the open and closed positions, and further preferably reciprocal linear or substantially linear movement.

In one embodiment the movable solenoid member, the plunger means and the actuator valve means are arranged to undergo movement in-line or substantially in-line with one or more movable parts of a dispensing nozzle assembly with which it is used or associated with in use.

In one embodiment the movable solenoid member, the plunger means and the actuator valve means are arranged to undergo movement in a direction parallel or substantially parallel with one or more movable parts of a dispensing nozzle assembly with which it is used or associated with in use.

Preferably the movable solenoid member, the plunger means and the actuator valve means are arranged to undergo movement in a direction parallel and/or in-line with a longitudinal axis of a nozzle member of a dispensing nozzle assembly with which it is used or associated with in use.

Preferably the actuator assembly is provided in or associated with a body portion.

Preferably fluid conduit means are defined through the actuator assembly body portion between fluid input means or fluid input and fluid output means or fluid output to allow fluid flow through the actuator assembly in use.

Preferably the fluid input means allows connection and/or fluid communication of the actuator assembly to a fluid source, or to connection to a further fluid conduit means for connection to a fluid source, in use.

Preferably the fluid conduit means or further fluid conduit means includes any member that allows fluid flow through the same in use, such as one or more channels, pipes, housing, conduits and/or the like.

Preferably the fluid output means allows connection and/or fluid communication of the assembly with a fluid channel or conduit of a dispensing nozzle assembly in use.

Preferably the fluid input means and/or fluid output means can include any suitable connection arrangement, such as for example, a screw thread fitting, bayonet fitting, push fit connection, inter-engaging members, one or more clips and/or the like.

Preferably the direction of fluid flow through the fluid input means into the actuator assembly in use is arranged transverse to, perpendicular or substantially perpendicular to the direction of fluid flow through the fluid output means in use.

Preferably the direction of fluid flow via the fluid input means into the actuator assembly is in a direction transverse, perpendicular or substantially perpendicular to the direction of movement of the movable solenoid member, the plunger means and/or the actuator valve means in moving between the open and closed positions in use.

Preferably the actuator valve means is any valve member that can be moved between open and closed positions with respect to an actuator valve seat.

In one embodiment the actuator valve seat is provided in defined in or integrally formed with the body portion of the actuator assembly.

In one embodiment the actuator valve seat is defined in a detachably attached part of the body portion.

Preferably the actuator valve seat is provided at, adjacent, upstream of or just below the fluid output means of the actuator assembly.

Preferably at least the part of the actuator valve means engaging with the actuator valve seat to form the closed position in use is complementary or substantially complementary in shape to the engaging surface of the actuator valve seat.

In one embodiment the actuator valve means is in the form of or includes a spindle head and/or is in the shape of a diverging or converging tapered member, is frustoconical in shape and/or the like.

Preferably the plunger means is any member that can move the actuation valve means or member between the open and closed positions.

Preferably the plunger means are provided on, associated with or integrally formed with the actuator valve means or the spindle head.

Preferably the plunger means are joined or provided on an end of the actuator valve means or spindle head opposite to the surface of the actuator valve means or spindle head that engages with the actuator valve seat in use.

Preferably fluid volume control means or member are provided on or associated with the plunger means, the actuator assembly and/or the fluid inlet means in use. This allows a pre-determined volume of fluid to flow through the actuator assembly in use and/or control of the volume of fluid being allowed to flow through the actuator assembly in use.

In one embodiment the fluid volume control means or member includes a flow spinner, a flow meter, a magnetic flow spinner, a manual magnetic flow spinner and/or the like.

In one example the fluid volume control means or member is in the form of a flow spinner or magnetic flow spinner, the pressure of the fluid flowing past the flow spinner causes the same to rotate in use. A flow counter provided adjacent the flow spinner is arranged to count the number of rotations of the flow spinner in use. Each rotation of the flow spinner allows a pre-determined volume of fluid to flow along the same. The rotation data is then used to control the volume of fluid flowing through the actuator assembly in use.

Preferably the fluid volume control means is located in the body portion at or adjacent the fluid inlet means, and preferably downstream of the fluid inlet means.

Preferably guide means or guide member are provided on or associated with the plunger means to maintain the position of the plunger means relative to the body portion in use, and/or to guide movement of the plunger means within the fluid conduit in use.

Preferably the guide means or guide member includes one or more clip members, support members and/or the like.

Preferably the plunger means has a first end provided with or associated with the actuator valve means and a second end, and further preferably second opposite end, provided with or associated with the movable solenoid member.

Preferably resilient biasing means or member are provided on or associated with the plunger means and/or movable solenoid member to resiliently bias the plunger means, movable solenoid member and/or actuator valve means to the closed position in use.

Preferably the resilient biasing means is in the form of one or more springs, sprung members and/or the like.

In a preferred embodiment the resilient biasing means is provide on, around or associated with the plunger means.

Preferably the movable solenoid member is in the form of a solenoid drive shaft for driving movement of the plunger means between the open and closed positions in use.

Preferably the solenoid drive shaft or movable solenoid member is a linear or substantially linear member.

Preferably the solenoid means includes a solenoid housing containing the solenoid.

Preferably the solenoid drive shaft or movable solenoid member is movably mounted in the solenoid housing.

Preferably power supply means are provided on or associated with the solenoid means or solenoid housing to allow an electrical power supply to be provided to the solenoid. Thus, the solenoid means can be moved between an "on", operational or powered condition, and an "off", non-operational or unpowered condition.

Preferably the solenoid housing is attached to the body portion via suitable attachment means, such as for example, one or more screws, nuts and bolts, inter-engaging members, clips, friction fit and/or the like.

In one embodiment fluid cooling means or mechanism are provided with, integrally formed with or associated with the fluid conduit means and/or the body portion of the actuator assembly to allow cooling of the dispensing fluid in use.

Preferably the fluid cooling means or mechanism includes one or more channels defined in or through the body portion of the actuator assembly that allows for the flow and/or location of a coolant or coolant fluid therein in use.

Preferably the fluid cooling means or mechanism are provided with, in communication with or associated with a fluid cooling source. The fluid cooling source can be refrigeration means and/or the like.

Preferably sealing means or member are provided on or associated with the actuator assembly for ensuring fluid flows along the fluid conduit defined therein without leaking to other parts of the body portion of the assembly or outside of the body portion.

Preferably the sealing means or member includes one or more o-rings, gaskets, sealing members, sealing collars and/or the like.

For example, sealing means can provided on or associated with the plunger means, the solenoid drive shaft, the movable solenoid member and/or a part of the body portion in which the plunger means, the solenoid drive shaft or movable solenoid member is movably located in use.

Sealing means can be provided on or associated with the fluid inlet and/or outlet means.

Sealing means can be provided on or associated with the actuator valve means and/or actuator valve seat.

In one embodiment the actuator assembly is joined to the dispensing nozzle assembly via joining means or joining mechanism.

Preferably the joining means or mechanism can include any or any combination of one or more screws, nuts and bolts, clips, inter-engaging members, complementary screws threads, bayonet fitting, friction fit and/or the like.

Preferably a housing portion of the dispensing nozzle assembly, and preferably a part of the housing portion at or adjacent a base of the housing portion, is joined via the joining means or mechanism to a top surface or surface of the body portion on which the fluid outlet means are provided.

In one embodiment a dispensing apparatus is provided that includes the dispensing nozzle assembly and the actuator assembly.

In one embodiment at least part of the switch means of the dispensing nozzle assembly is provided on or associated with the body portion of the actuator assembly. For example, a magnetic sensor of the switch means can be provided on or associated with the body portion of the actuator assembly in use.

Preferably the solenoid means, the fluid cooling means, the switch means and/or the fluid volume control means are in wired or wireless communication with control means or control unit. The control means or unit can be the same or separate to the control means or unit provided on or associated with the dispensing nozzle assembly.

Preferably the control means or unit includes microprocessing means for controlling one or more components in the dispensing apparatus in use.

According to one aspect of the present invention there is provided a method of using an actuator assembly for allowing fluid to flow from a fluid source to a dispensing nozzle assembly in use, said actuator assembly including actuator valve means, said method including the steps of:

moving plunger means which moves the actuator valve means between a closed position, wherein the actuator valve means engages with an actuator valve seat and fluid is prevented from flowing through the actuator valve means towards a dispensing nozzle assembly, and an open position, wherein the actuator valve means is moved a spaced distance apart from the actuator valve seat and fluid can flow through or around the actuator valve means in use towards a dispensing nozzle assembly, wherein the actuator assembly further includes solenoid means for driving movement of the plunger means in use, the solenoid means including a movable solenoid member, characterised in that the movable solenoid member and the plunger means are arranged such that they undergo parallel or substantially parallel movement in moving the actuator valve means between the open and closed positions.

According to a further aspect of the present invention there is provided a method of using and/or assembling dispensing apparatus.

According to one aspect of the present invention there is provided a receptacle for use with bottom filling dispensing apparatus, said receptacle having a base wall, one or more side walls protruding outwardly from the base wall at a first end or ends of the side walls, a cavity defined between the side walls and the base wall, a second end or ends of the side walls defining a first opening for access to the receptacle cavity, valve means provided on or associated with the base wall of the receptacle and movable between open and closed positions to allow the receptacle to be bottom filled by dispensing apparatus in use, characterised in that valve means is formed from or consists of non-magnetic material or materials and is located centrally or substantially centrally of the base wall.

Thus, one aspect of the present invention provides a receptacle that can be bottom filled in use. The use of non-magnetic valve means allows the receptacle of the present invention to be fully recyclable and makes the receptacle less expensive to produce. The provision of the valve means centrally of the base wall of the receptacle allows the receptacle to be provided in an in-line arrangement with dispensing apparatus in use and allows even or substantially even distribution of fluid into the receptacle in use. The even fluid distribution helps to control the amount of foam generated by a fluid being dispensed in use.

Preferably the valve means is a self-sealing valve arrangement.

Preferably with the valve means in the open position, fluid or liquid can enter into the receptacle through the valve means in use.

Preferably with the valve means in the closed position, fluid or liquid is prevented from entering or leaving the receptacle through the valve means. Thus, the valve means is in a fluid tight sealing position when in the closed position.

Preferably the valve means is arranged so as to be biased or resiliently biased to the closed position in use.

Preferably the valve means is movable from the closed position to the open position as a result of at least part of a dispensing nozzle assembly being inserted through the valve means in use.

Preferably the valve means is formed from or consists of a recyclable material, rubber, silicon, plastic and/or the like.

In preferred embodiment the valve means is in the form of a silicon valve or seal, silicon flange valve or seal, slit valve, non-return valve and/or the like.

Preferably the valve means is disc shaped or circular in shape, although the valve means could be any required shape.

Preferably one or more slits or cuts are provided in the valve means, and preferably centrally or substantially centrally thereof, to allow at least part of a dispensing nozzle assembly of the dispensing apparatus to be located through the valve means in use to provide the open position.

Preferably one or more flaps of the valve means defined by the slits or cuts move to a closed position when said part of the dispensing nozzle assembly is removed from the slits or cuts.

Preferably the one or more slits or cuts are provided in a cross or cross cut arrangement, such as for example "+" or "X" arrangement.

In one embodiment the valve means is integrally formed with at least a base wall of the receptacle.

In one embodiment the valve means is attached or detachably attached to the base wall of the receptacle via attachment means. In one example, detachable attachment of the valve means to the receptacle allows replacement and/or repair of the valve means in use.

Preferably the valve means is attached to the receptacle via mechanical engagement.

Preferably the attachment means include any or any combination of one or more retaining rings, recesses, flanges, clips, inter-engaging members, friction fit, adhesive, welding, heating sealing and/or the like.

In one embodiment valve location means are formed or provided on an inner facing surface of the base wall of the receptacle to allow engagement with at least a part of the valve means and/or attachment means of the valve means in use.

Preferably the receptacle is formed from, includes or consists of a recyclable material, a plastic material, polypropylene, polypropylene 5 (PP5), polycarbonate, glass and/or the like.

Preferably an external surface of the base wall has a recess defined in the same, and further preferably the recess is provided centrally or substantially centrally of the base wall. Preferably this external base recess creates a gap between part of the base of the receptacle and a dispensing nozzle assembly with which it is located in use.

Preferably the valve means is positioned on a wall of the base wall recess, and further preferably centrally or substantially centrally of the base wall recess.

Preferably the receptacle is in the form of a cup or is cup shaped.

Preferably the valve means of the receptacle is arranged so that the receptacle is filled via a dispensing nozzle assembly below a surface of the fluid or liquid entering the receptacle in use.

Preferably the receptacle is for use with a dispensing nozzle assembly provided on or associated with bottom filling dispensing apparatus.

It will be appreciated that the receptacle, nozzle dispensing assembly and/or actuator assembly can be used together or independently of each other as required.

The fluid being dispensed via the apparatus and/or assembly can be any suitable fluid or liquid, such as for example a beverage, carbonated beverage, alcoholic or non-alcoholic beverage, beer, soft drink and/or the like.

The fluid source can be any suitable reservoir for supplying and/or containing a fluid therein, such as a pressurised cylinder, a container, a keg, bottle and/or the like.

Embodiments of the present invention will now be described with reference to the following figures, wherein:

FIG. 1a is a partial side view of a bottom fill receptacle according to an embodiment of the present invention;

FIG. 1b is a plan view of valve means used in the receptacle in FIG. 1a according to an embodiment of the present invention;

FIG. 1c is a side view of the receptacle located on a dispensing nozzle assembly according to one embodiment;

Figure 2A:
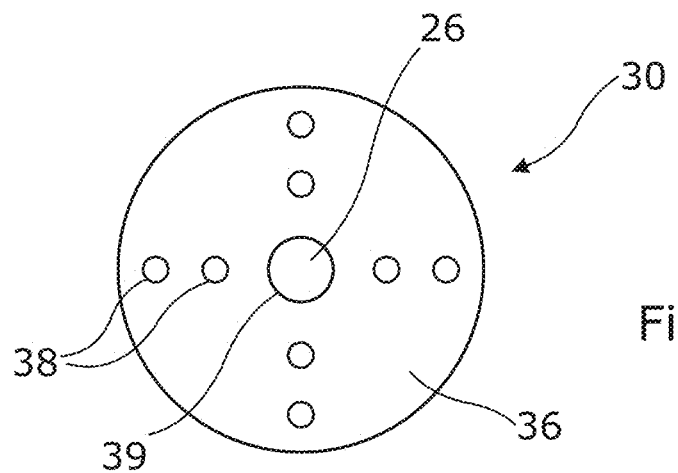
FIGS. 2a-2c show a top plan view, a side view in a closed position and a side view in an open position of the dispensing nozzle assembly shown in FIG. 1c respectively.

Referring to the FIGS. 1a-2c, there is illustrated a receptacle 2 which can be bottom filled in use via a dispensing nozzle assembly 4 in accordance with an embodiment of the present invention.

The receptacle 2 comprises a base wall 6 with a side wall 8 protruding upwardly from the base wall from the peripheral edge thereof. The base and side walls define a cavity 10 therebetween for the location of a fluid therein in use. A free end (not shown) of the side wall 8 defines a top opening to the cavity. The receptacle could be filled via the top opening as is conventionally done. However, the receptacle can also be filled via the bottom of the container, as will be explained in more detail below.

In accordance with the present invention, valve means in the form of a silicon valve seal 12 is provided centrally of the base wall 6 of the receptacle 2. A planar surface of the seal is provided parallel to a planar surface of the receptacle. More particularly, a recess 14 is defined on an external side of base wall 6 and seal 12 is provided in the base wall 16 of the recess 14 in a central position. It will be appreciated that the base wall 6 could be a flat or planar surface if required, with the recess 14 being optional. In this embodiment the seal would be located centrally of the base wall 6.

The seal 12 is disc shaped in this example and includes a cross shaped slit 18 which is movable between open and closed positions in use. The seal 12 is self-closing and is biased to the closed position. The seal 12 is only moved to an open position when a dispensing nozzle member 20 of dispensing nozzle assembly 4 is located through the same in use.

The seal can be engaged with the base wall 16 of the receptacle via any suitable means. For example, a retaining ring 22 provided on the peripheral edge of seal 12 can engaged with a retaining recess (not shown) provided on an interior surface of base wall 6/16. The seal can be retained in place within the retaining recess via friction fit. This allows the seal 12 to be repaired and/or replaced as and when required.

The dispensing nozzle assembly 4 comprises a housing portion 24. Nozzle member 20 has a first end that protrudes perpendicularly outwardly from an upper surface of housing portion 24. Nozzle member 20 has a second free end 26 that is arranged to be pushed through the cross shaped slit 18 of the seal 12 in use from the exterior side of base wall 6. Second free end 26 is dome shaped so as to reduce the likelihood of damage to the seal during insertion and/or removal of end 26 relative to the same in use.

A plurality of dispensing apertures 28 (only two of which are shown for clarity purposes) are arranged adjacent end 26 of dispensing nozzle member 20 for dispensing fluid therefrom in use. The dispensing apertures 28 are arranged equidistance apart and in a vertically aligned manner around the external side walls of the nozzle member 20 to provide even dispensing of fluid from the nozzle member in use. This helps to reduce foam formation in the fluid being dispensed. In addition, the size and/or shape of the apertures 28 can be adjusted to optimize or control the amount of foam produced during dispensing.

In one example the aperture 28 can be slot like inform and a longitudinal axis of the slot can be parallel to a longitudinal axis of the nozzle member 20.

Closure means in the form of closure member 30 is movably mounted on the housing portion 24 for movement relative to nozzle member 20 to move the dispensing apertures 28 between open and closed positions in use. With the closure member 30 in a closed position, fluid is prevented from flowing out of the dispensing apertures 28. With the closure member 30 in an open position, fluid can flow out of the dispensing apertures 28.

Figure 2B:
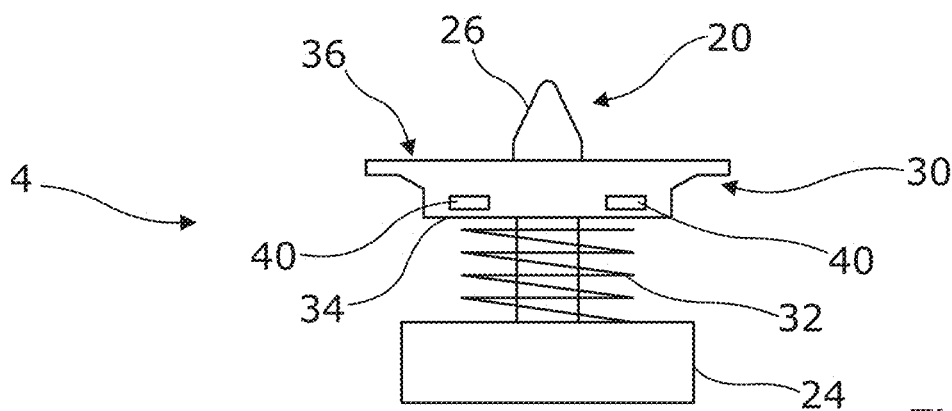

Closure member 30 is resiliently biased to the closed position, as shown in FIG. 2b, via resilient biasing means in the form of spring 32. More particularly, spring 32 is located between a base surface 34 of closure member 30 and housing portion 24.

The closure member 30 is capable of moving in a reciprocal linear manner in a direction parallel to a longitudinal axis of the nozzle member 20 between the open and closed positions in use. Thus, the closure member 30 is able to move between a raised position, corresponding to the closed position, and a lowered position, corresponding to the open position, with respect to the nozzle member 20 and the housing portion 24.

Sealing means can be provided on or associated with the interior surface of the closure member to ensure sealing closure of the dispensing apertures when in a closed position.

An upper surface 36 of closure member 30, opposite to base surface 34, acts as a receptacle location surface. Surface 36 is typically planar to provide a stable surface on which a base of the receptacle can be located in use. However, locating members or means can be provided on surface 36 if required to allow a positive location connection with the base of the receptacle in use.

Drainage means in the form of drainage apertures 38 are defined in surface 36 of closure member 30 to allow any drips or excess fluid from the dispensing process to be drained away in use. The apertures 38 can communicate with any suitable drainage pipe, channel, container and/or the like as required.

A centrally located channel 39 is defined through closure member 30 for the location of the nozzle member 20 therethrough.

A fluid channel is defined through dispensing nozzle member 20 which is in fluid communication with an actuator assembly, a fluid source and/or fluid conduit and the dispensing apertures to allow fluid to flow from the actuator assembly, a fluid source and/or fluid conduit through the dispensing apertures when the closure means is in an open position in use.

Switch means are provided with the dispensing nozzle assembly 2 to allow fluid to flow into the assembly 2 in use. The switch means can be moved between an "on" position, wherein fluid is able to flow into assembly 2, and an "off" position, wherein fluid is prevented from flowing into assembly 2 in use.

More particularly, the switch means is in the form of a magnetic switch including magnetic strips 40 provided in or on closure member 30 adjacent base surface 34 thereof, and a magnetic sensor (not shown) provided in the housing portion 24. Alternatively, the magnetic sensor could be provided in an actuator assembly, as described in more detail below. When the closure member 30 is in the closed position, the magnetic strips 40 are provided a pre-determined distance above the magnetic sensor in housing portion 24 and the sensor is an un-activated state or the "off" position. As the closure member 30 is moved towards the housing portion 24 to provide the open position, the magnetic strips 40 are moved a pre-determined distance above housing portion 24 and into a sufficiently close proximity of the magnetic sensor to activate the same or move it to the "on" position.

The magnetic sensor is arranged to be in wired or wireless communication with control means or processing means (not shown) to allow the switch to be moved between the "on" and "off" positions in use and/or to control other parts of dispensing apparatus in use.

Figure 2C:
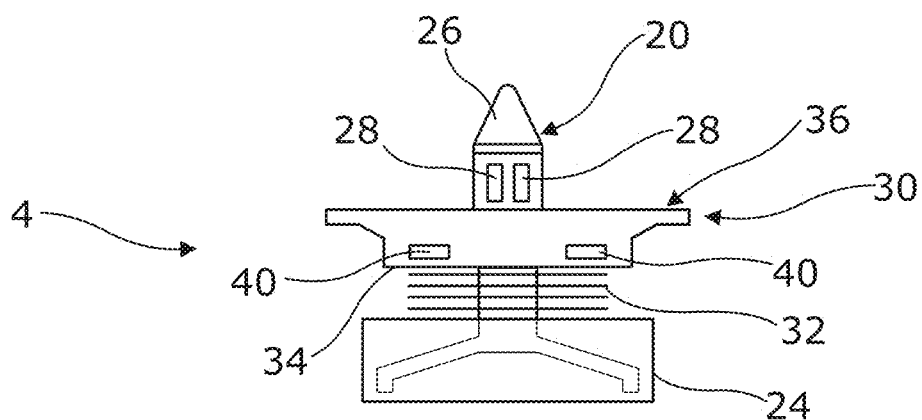

In use, a user places the base 6 of the receptacle 2 on upper surface 36 of the closure member 30 and pushes the receptacle 2 towards the housing portion 24. The free end 26 of nozzle member 20 penetrates through the slit 18 of seal 12 and moves the seal from a closed position to an open position. Application of a further downwards force on the receptacle or closure member 30 by a user towards housing portion 24 moves the closure member 30 from the closed position to the open position. This movement moves the closure member 30 clear of the dispensing apertures 28 on the dispensing nozzle, as shown in FIGS. 1c and 2c. At the same time, the magnetic strips 40 in closure member 30 are moved towards housing portion 24 a distance sufficient to activate the switch to move the same from the off position to the on position, thereby allowing fluid to flow into the nozzle assembly 2 from a fluid source or actuator assembly and out through the apertures 28.

The flow of fluid is stopped once the user releases the downwards force on the receptacle 2 and closure member 30. As the user lifts the receptacle 2 from closure member 30, the spring 32 associated with the base wall 34 of closure member 30 automatically pushes the closure member 30 in an upwardly direction away from the housing portion 24 from the open position to the closed position. As the closure member 30 moves away from the housing portion 24, the magnetic strips 40 in closure member 30 are moved a pre-determined distance away from housing portion 24, thereby moving the switch to the off position. The control means can then stop the flow of fluid into the nozzle dispensing assembly.

The nozzle can be detachably attached to the housing portion via complementary screw threads if required. This allows the nozzle to be easily attached and detached for cleaning purposes as and when required.

Figure 3A:
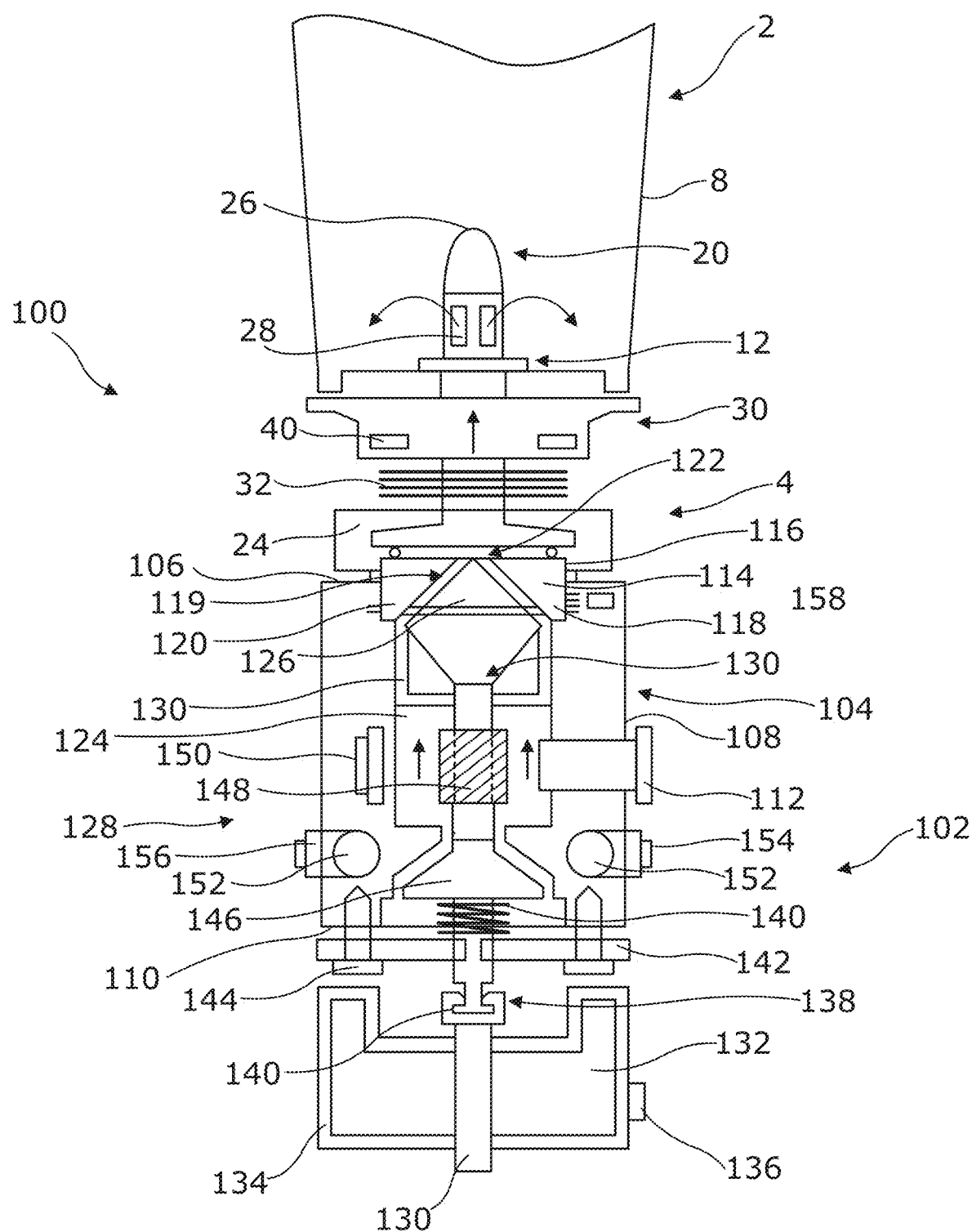
FIGS. 3a-3b show cross sectional views taken through dispensing apparatus including an actuator assembly and dispensing nozzle assembly, in an open position and closed position respectively.
Figure 3B:
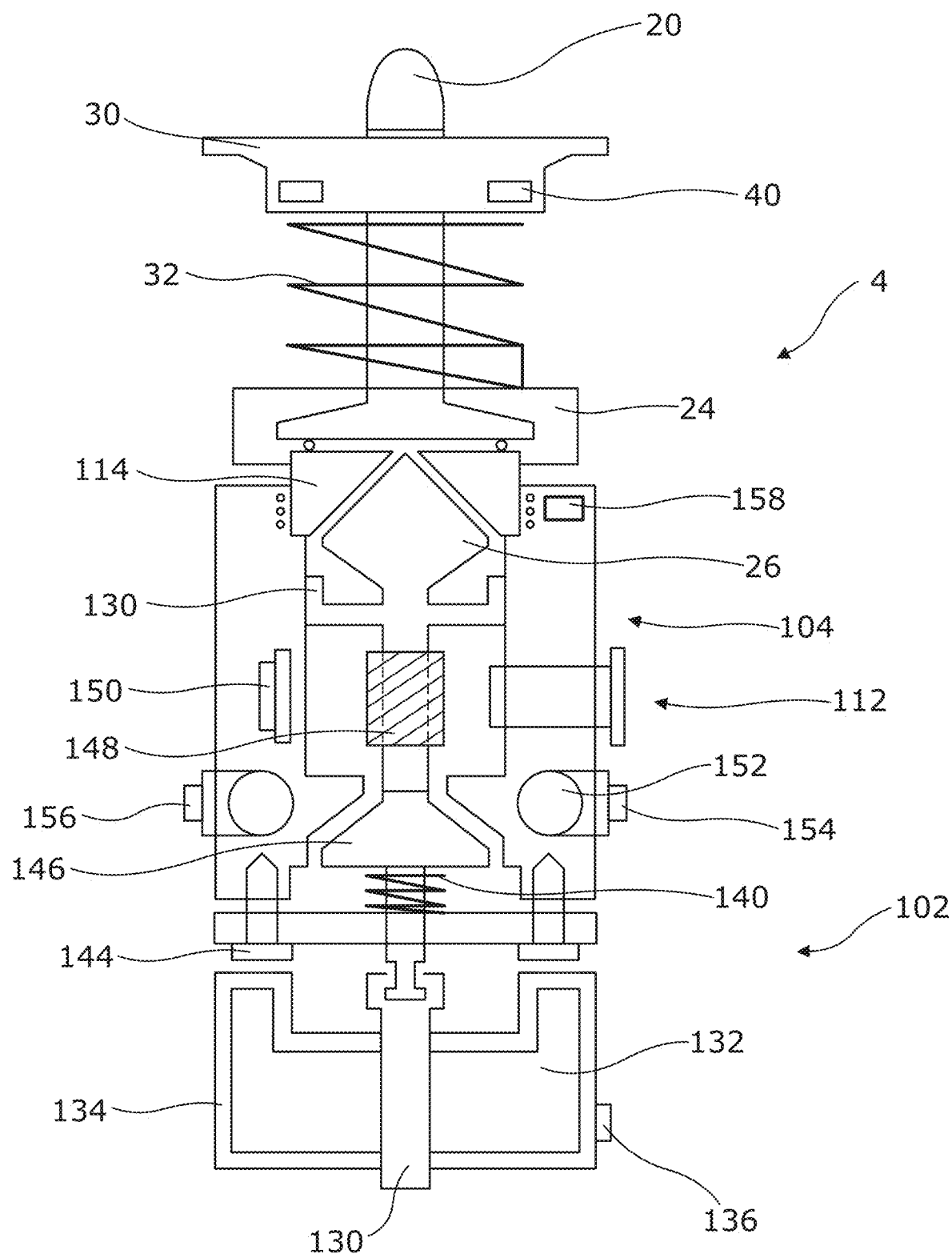

Referring to FIGS. 3a-3b, there is illustrated dispensing apparatus 100 according to an embodiment of the present invention in an open position and closed position respectively.

The dispensing apparatus 100 comprises an actuator assembly 102 that is movable between an actuated or open position, wherein fluid can flow through the actuator assembly from a fluid source to the dispensing nozzle assembly 4 in use, and a non-actuated or closed position, wherein fluid is prevented from flowing through the actuator assembly from a fluid source to the dispensing nozzle assembly 4 in use.

The actuator assembly 102 includes a body portion 104 having a top wall 106, side walls 108 and a base wall 110. Fluid inlet means in the form of an inlet connector 112 is provided in the side wall 108 of body portion 104. Fluid outlet means in the form of a fluid outlet connector 114 is provided in the top wall 106 of the body portion 104.

The fluid inlet connector 112 can be connected directly to a fluid source, such as a fluid container, or can be connected to a further fluid conduit, such as a fluid pipe, which is then connected to a fluid source in use.

The fluid outlet connector 114 has a first connection portion provided adjacent a first end thereof for connection to the housing portion 24 of the dispensing nozzle assembly 4, and a second connection portion provided adjacent a second opposite end for connection to the body portion of the actuator assembly 102. In the illustrated example, first connection portion is in the form of an external screw thread 116 which engages with a complementary internal screw thread provided on housing portion 24. The second connection portion is also in the form of an external screw thread 118 which engages with a complementary internal screw threaded provided on body portion 104 of assembly 102. The screw thread arrangement allows the fluid outlet connector 114 to be detachably attached for cleaning, repair and/or for access to the actuator valve means located in the body portion 104 in use.

A fluid channel 119 in defined through the fluid outlet connector 104. The interior walls 120 defining the fluid channel also define the valve seat for the actuator valve means. An opening 122 of fluid channel 119 adjacent the housing portion 24 of the dispensing nozzle assembly 4 is in fluid communication with the fluid conduit passing through the nozzle member 20.

A fluid channel 124 is defined in body portion 104 between the fluid inlet connector 112, the fluid channel 119 and the fluid outlet connector 114. Fluid is able to flow from the fluid inlet connector to the fluid outlet connector in use when the actuator valve means of the assembly 102 is in an open position.

It is to be noted that the fluid inlet connector 112 and the fluid outlet connector 114 are arranged such that fluid flows into the fluid channel 124 from the fluid inlet connector 112 in a direction perpendicular to the direction of fluid flow out of channel 124 via fluid outlet connector 114.

Actuator valve means are located in the fluid channel 124 for allowing the actuator assembly 102 to be moved between the open and closed positions in use.

More particularly, actuator valve means includes a valve or spindle head 126 and plunger means in the form of a spindle shaft 128 joined to or integrally formed with the spindle head 126 at a first end 130 thereof. The external shape of the spindle head 126 is complementary in shape to the valve seat 120 so that sealing engagement can be provided between the spindle head 126 and the valve seat 120 when the actuator assembly is in a closed position in use.

Guide means in the form of a spindle clip 130 retains the spindle in position within fluid channel 124 in use.

The spindle head 126 and spindle shaft 128 are movably mounted within the fluid channel 124 for movement between a closed position, wherein spindle head 126 is engaged with valve seat 120 and fluid cannot pass from fluid channel 124 into the dispensing nozzle assembly 4, and an open position, wherein spindle head 126 is moved clear of valve seat 120 and fluid can pass from fluid channel 124 into the dispensing nozzle assembly 4.

Movement of the spindle shaft 128 between the open and closed positions is driven by a movable solenoid member in the form of solenoid drive shaft 130. The solenoid drive shaft 128 forms part of a solenoid 132 provided in solenoid housing 134. The solenoid 132 is provided with electrical power in use via a power supply input connection 136.

One end 138 of solenoid drive shaft 130 is connected to end 140 of spindle drive shaft 128. When electrical power is supplied to the solenoid 132, this drives movement of the solenoid drive shaft 130, and therefore the spindle drive shaft 128 between raised and lowered positions, corresponding to the closed and open positions of the actuator assembly 102 respectively.

When the solenoid drive shaft 130 is moved towards body portion 104 and dispensing nozzle assembly 4, this moves the spindle drive shaft 128 towards valve seat 120 and engages spindle head 126 in valve seat 120 to provide the closed position. When the solenoid drive shaft is moved away from body portion 104 and dispensing nozzle assembly 4, this moves the spindle drive shaft 128 away from valve seat 120 and disengages spindle head 126 from valve seat 120 to provide the open position.

Resilient biasing means in the form of a spring 140 are provided around spindle drive shaft 128 to bias the spindle drive shaft to the closed position in use.

Thus, the solenoid drive shaft 130, the spindle drive shaft 128 and the spindle head 126 are arranged to undergo reciprocal linear motion in a direction parallel to a longitudinal axis of the spindle drive shaft 128 and the solenoid drive shaft 130. This movement is also parallel to the movement of the closure member 30 of the dispensing nozzle assembly 4 between closed and open positions. The solenoid drive shaft 130, the spindle drive shaft 128, the spindle head 126 and the nozzle member 20 are all in line. This allows a more compact design to be produced which is simpler in construction compared to prior art design, is more efficient and less expensive to produce.

A support plate 142 is provided adjacent end 140 of spindle drive shaft 128 to support the same in use relative to the base 110 of body portion 104. The support plate 142 is connected to body portion 104 via bolts 144. The solenoid housing 134 is connected to or provided adjacent to support plate 142.

Sealing means in the form of a collar seal 146 are provided around the spindle drive shaft 128 to prevent fluid from leaking from fluid channel 124 towards solenoid housing 134.

Fluid flow control means in the form of a flow spinner 148 is provided on the spindle drive shaft 128 within fluid channel 124 adjacent the fluid inlet connector 112. The flow of fluid past the spinner 148 causes the same to rotate in use. The number of rotations of spinner 148 is counted by flow counter 150. Each rotation of the spinner corresponds to a known volume of fluid passing along the same. This allows the volume of fluid flowing through the actuator assembly 102 in use to be monitored and/or controlled.

Fluid cooling means for cooling the fluid being dispensed via the apparatus 100 are provided. The fluid cooling means are in the form of fluid cooling channels 152 integrally formed in body portion 104. The cooling channels 152 are in fluid communication with a cooling inlet connector 154 and a cooling outlet connector 156 to allow cooling fluid to enter and leave the body portion 104. The cooling fluid can be cooled by refrigeration means or temperature control means as required.

Control means can be provided as previously mentioned for control of the coolant fluid flowing through the apparatus in use, the fluid flow control means, the solenoid and/or the like.

Part of the switch for the dispensing nozzle assembly 4 can be provided with the actuator assembly 102 if required. For example, a magnetic sensor 158 for detecting the magnetic strips 40 in the closure member 30 can be provided in or on the body portion 104 if required, and preferably at or adjacent a top wall of the body portion.

In use of the dispensing apparatus 100, a user places a receptacle 2 on the top surface 36 of closure member 30 and applies a downwards force to the same. The dispensing nozzle 20 engages through valve 12 in the base of the receptacle to form an open position. Further application of downwards force on the closure member via the receptacle moves the closure member 30 towards the housing portion 24. This results in the dispensing apertures 28 on the dispensing nozzle 20 being moved from a closed position to an open position. The magnetic strip 40 in the closure member 30 is moved towards the magnetic sensor 158 provided in the body portion 104 of the actuator assembly 102. The magnetic sensor 158 senses this movement and signals to control means that actuation of the actuator assembly 102 is required.

The control means then signals to the solenoid 132 that the actuator assembly needs to be moved from a non-actuated or closed position to an actuated or open position. The solenoid is moved from a non-activated position to an activated position, which causes solenoid shaft 130 to move away from body portion 104, thereby pulling spindle shaft 128 and spindle head 130 towards solenoid 132. This moves the actuator valve means/spindle head from a closed position to an open position. Fluid contained in channel 24 can therefore flow out of fluid outlet connector 114, into the fluid channel of the dispensing nozzle member 20 and out through apertures 28. This fluid flow causes fluid to flow from the fluid source and through fluid inlet connector 112. This fluid flow causes flow spinner 148 to rotate. The number of rotations of the flow spinner is measured by flow counter 150. The flow counter signals the flow data to the control means.

Once a pre-determined volume of fluid flow has been detected, such as for example an amount corresponding to a pre-determined fluid measure in receptacle 2, the control means signals to the solenoid 132 to move from the activated position to the non-activated position. The solenoid drive shaft 130 is therefore moved from the lowered to the raised position under the biasing action of the spring 140 associated with the spindle shaft 128. The spindle head 126 is moved back into engagement with valve seat 120, thereby moving the actuator assembly to the closed position. Fluid is prevented from flowing from the actuator assembly to the dispensing nozzle assembly. A user can therefore remove the receptacle from the dispensing nozzle assembly, thereby closing the valve seal in the bottom of the receptacle and retaining the fluid within the receptacle.

In an alternative method of use, a user can remove the receptacle from the dispensing nozzle assembly before the solenoid 132 is moved to the non-activated position. This causes the closure member 30 to be moved to the closed position, which is detected by the magnetic sensor 158. The magnetic sensor 158 can then signal to the control means to move the solenoid 132 to the non-activated position, thereby stopping the flow of fluid from the actuator assembly 104 to the dispensing nozzle assembly 4.

Figure 4:
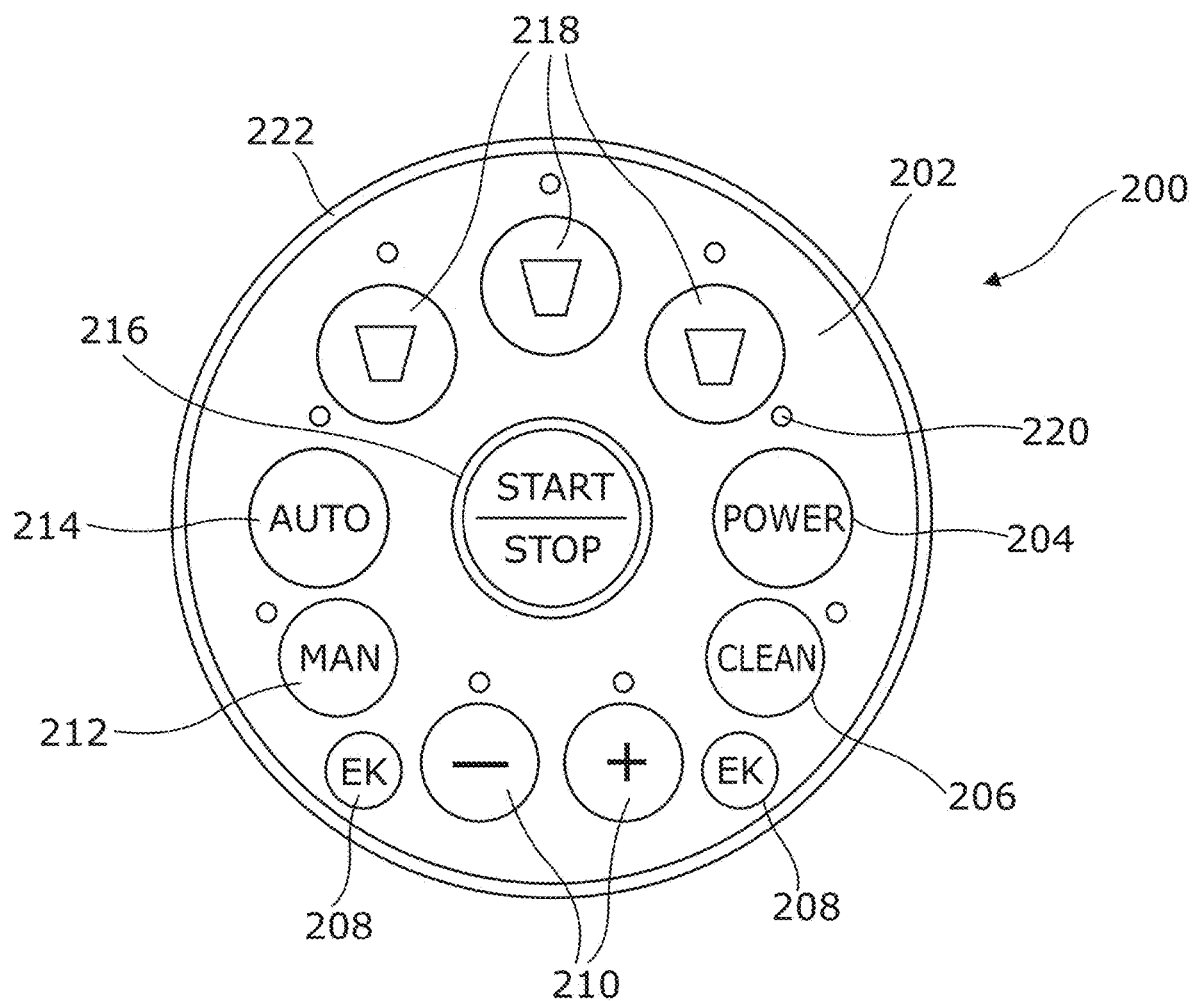
FIG. 4 is an example of a control panel for use with the dispensing apparatus of the present invention.

Referring to FIG. 4, there is illustrated an example of a control panel 200 or user interface that can be used with the dispensing apparatus 100 of the present invention. A front face 202 of the control panel 200 can include a power on/off button 204 for allowing the dispensing apparatus to be switched between and powered or non-powered condition; a cleaning mode button 206 for allowing the dispensing apparatus to be placed in a cleaning mode; a warning light to identify an empty fluid source or keg 208; increase and decrease buttons 210 for increasing or decreasing the measured volume of fluid being dispensed via the dispenser in use; a manual use button 212 for allowing a user to dispense a user selected volume of fluid from the apparatus in use; an automatic button 214 for allowing a default volume of fluid to be dispensed; a start/stop button 216 but moving the apparatus between start/open position and stop/closed position; buttons 218 for allowing a pre-determined volume of fluid to be dispensed corresponding to a pre-determined receptacle size (such as small, medium and large); LED lights 220 associated with each button to allow a user to visually determine whether a button has been actuated on the control panel; outer peripheral rim light 222 for allow a user to visually determine whether a fluid is being dispensed.

The control panel can be associated with a data collection means to allow data to be recorded on the volumes of liquid being dispensed and the actions undertaken via the panel. It could be powered by mains power or battery power as required.

The invention claimed is:

1. A dispensing nozzle assembly comprising:
a nozzle member provided with one or more dispensing apertures to allow fluid to be dispensed therefrom in use;
closure means provided on or associated with the nozzle member and movable relative thereto between a closed position, wherein the closure means closes the one or more dispensing apertures and fluid cannot be dispensed from the one or more dispensing apertures, and an open position, wherein the closure means are moved at least partially clear of the one or more dispensing apertures and fluid can be dispensed through the dispensing apertures in use;
switch means moveable between an "on" position for allowing fluid to flow into the nozzle member for dispensing through the one or more dispensing apertures in use, and an "off" position for preventing fluid flowing into the nozzle member in use;
wherein the switch means are arranged such that movement of the closure means relative to the nozzle member moves or actuates the switch means between the on and off positions in use;
wherein the dispensing nozzle assembly is for use with a bottom filling fluid dispensing apparatus for dispensing fluid into a receptacle via a base of the receptacle in use; and
wherein the closure means is movable from the closed position to the open position in use by:
placing the receptacle on the closure means; and/or
pushing down manually on the closure means and/or the receptacle if the receptacle is located on the closure means.

2. The dispensing nozzle assembly according to claim 1, wherein the closure means are resiliently biased to the closed position in use via resilient biasing means or a resilient biasing member.

3. The dispensing nozzle assembly according to claim 1, wherein the closure means is arranged to move in a direction parallel or substantially parallel to a longitudinal axis of the nozzle member in use, is arranged to be move in a vertical or substantially vertical direction and/or is arranged to undergo linear or substantially linear movement in moving between the open and closed positions in use.

4. The dispensing nozzle assembly according to claim 1, wherein two or more dispensing apertures are provided on the nozzle member, and said two or more dispensing apertures are arranged evenly or at substantially evenly spaced distances apart.

5. The dispensing nozzle assembly according to claim 1, further comprising a housing portion; the nozzle member being integral with the housing portion, or attached or detachably attached to the housing portion via securing means.

6. The dispensing nozzle assembly according to claim 1, wherein drainage means are provided on or associated with the closure means for allowing fluid that does not enter a receptacle in use to drain away from the closure means and/or assembly.

7. The dispensing nozzle assembly according to claim 1, wherein sealing means are provided on or associated with the closure means to seal the one or more dispensing apertures of the nozzle member when in a closed position in use.

8. The dispensing nozzle assembly according to claim 1, wherein fluid conduit means are provided in, on or associated with the nozzle member to allow fluid to flow from a fluid source or actuator assembly to the one or more dispensing apertures of the nozzle member.

9. The dispensing nozzle assembly according to claim 1, wherein the switch means is a magnetic switch or an electromagnetic switch.

10. The dispensing nozzle assembly according to claim 1 further comprising:
   an actuator assembly for allowing fluid to flow from a fluid source to the dispensing nozzle assembly in use, said actuator assembly including actuator valve means movable between a closed position,
   wherein the actuator valve means engages with an actuator valve seat and fluid is prevented from flowing through the actuator valve means towards a dispensing nozzle assembly, and an open position,
   wherein the actuator valve means is moved a spaced distance apart from the actuator valve seat and fluid can flow through or around the actuator valve means in use towards a dispensing nozzle assembly, said actuator assembly further including:
      plunger means for moving the actuator valve means between the open and closed positions in use, and
      solenoid means for driving movement of the plunger means in use, the solenoid means including a movable solenoid member,
      wherein the movable solenoid member and the plunger means are arranged such that they undergo parallel or substantially parallel movement in moving the actuator valve means between the open and closed positions.

11. A receptacle for use with the dispensing nozzle assembly according to claim 1, said receptacle comprising:
   a base wall,
   one or more side walls protruding outwardly from the base wall at a first end or ends of the side walls,
   a cavity defined between the side walls and the base wall,
   a second end or ends of the side walls defining a first opening for access to the receptacle cavity,
   valve means provided on or associated with the base wall of the receptacle and movable between open and closed positions to allow the receptacle to be bottom filled by the nozzle member in use, said valve means is formed from or consists of non-magnetic material or materials and is located centrally or substantially centrally of the base wall.

12. A dispensing nozzle assembly comprising:
   a nozzle member provided with one or more dispensing apertures to allow fluid to be dispensed therefrom in use;
   closure means provided on or associated with the nozzle member and movable relative thereto between a closed position, wherein the closure means closes the one or more dispensing apertures and fluid cannot be dispensed from the one or more dispensing apertures, and an open position, wherein the closure means are moved at least partially clear of the one or more dispensing apertures and fluid can be dispensed through the dispensing apertures in use;
   a magnetic switch moveable between an "on" position for allowing fluid to flow into the nozzle member for dispensing through the one or more dispensing apertures in use, and an "off" position for preventing fluid flowing into the nozzle member in use;
   wherein the magnetic switch is arranged such that movement of the closure means relative to the nozzle member moves or actuates the magnetic switch between the on and off positions in use;
   wherein the magnetic switch includes magnetic means or a magnetic member on or associated with one of the closure means or a housing portion of the assembly, and a magnetic sensor provided on or associated with the other of the closure means or the housing portion, the magnetic switch arranged such that when the magnetic means or member is moved a pre-determined distance towards the magnetic sensor, the switch is moved to the on position, and when the magnetic means or member is moved a pre-determined distance away from the magnetic sensor, the switch is moved to the off position.

13. A dispensing nozzle assembly comprising:
   a nozzle member provided with one or more dispensing apertures to allow fluid to be dispensed therefrom in use;
   closure means provided on or associated with the nozzle member and movable relative thereto between a closed position, wherein the closure means closes the one or more dispensing apertures and fluid cannot be dispensed from the one or more dispensing apertures, and an open position, wherein the closure means are moved at least partially clear of the one or more dispensing apertures and fluid can be dispensed through the dispensing apertures in use;
   switch means moveable between an "on" position for allowing fluid to flow into the nozzle member for dispensing through the one or more dispensing apertures in use, and an "off" position for preventing fluid flowing into the nozzle member in use;
   wherein the switch means are arranged such that movement of the closure means relative to the nozzle member moves or actuates the switch means between the on and off positions in use; and
   wherein the switch is in wired or wireless communication with control means for controlling one or more operations conditions relating to the dispensing nozzle assembly.

14. A method of using a dispensing nozzle assembly, the dispensing nozzle assembly comprising:
   a nozzle member provided with one or more dispensing apertures to allow fluid to be dispensed therefrom in use; said method including the steps of:
   moving closure means provided on or associated with the nozzle member relative thereto between a closed position, wherein the closure means closes the one or more dispensing apertures and fluid cannot be dispensed from the one or more dispensing apertures, and an open position, wherein the closure means are moved at least partially clear of the one or more dispensing apertures and fluid can be dispensed through the one or more dispensing apertures in use;
   moving switch means between an "on" position for allowing fluid to flow into the nozzle member for dispensing through the one or more dispensing apertures in use, and an "off" position for preventing fluid flowing into the nozzle member in use;
   wherein the switch means are arranged such that movement of the closure means relative to the nozzle member moves or actuates the switch means between the on and off positions;

wherein the dispensing nozzle assembly is for use with a bottom filling fluid dispensing apparatus for dispensing fluid into a receptacle via a base of the receptacle in use; and wherein the closure means is movable from the closed position to the open position in use by:
placing the receptacle on the closure means; and/or
pushing down manually on the closure means and/or the receptacle if the receptacle is located on the closure means.

15. The method according to claim 14, wherein the dispensing nozzle assembly includes an actuator assembly for allowing fluid to flow from a fluid source to a dispensing nozzle assembly in use, said actuator assembly including actuator valve means, said method further including:
moving plunger means which moves the actuator valve means between a closed position,
wherein the actuator valve means engages with an actuator valve seat and fluid is prevented from flowing through the actuator valve means towards a dispensing nozzle assembly, and an open position,
wherein the actuator valve means is moved a spaced distance apart from the actuator valve seat and fluid can flow through or around the actuator valve means in use towards a dispensing nozzle assembly,
wherein the actuator assembly further includes solenoid means for driving movement of the plunger means in use, the solenoid means including a movable solenoid member,
wherein the movable solenoid member and the plunger means are arranged such that they undergo parallel or substantially parallel movement in moving the actuator valve means between the open and closed positions.

* * * * *